(12) United States Patent
Dall'Occo et al.

(10) Patent No.: US 7,208,436 B2
(45) Date of Patent: *Apr. 24, 2007

(54) CATALYST COMPONENTS FOR THE POLYMERIZATION OF OLEFINS

(75) Inventors: Tiziano Dall'Occo, Ferrara (IT); Gianfrancesco Margelli, Occhiobello (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/517,587

(22) PCT Filed: May 19, 2003

(86) PCT No.: PCT/EP03/05268

§ 371 (c)(1),
(2), (4) Date: Dec. 9, 2004

(87) PCT Pub. No.: WO03/106511

PCT Pub. Date: Dec. 24, 2003

(65) Prior Publication Data

US 2005/0215424 A1    Sep. 29, 2005

(30) Foreign Application Priority Data

Jun. 13, 2002  (EP) ................... 02077418

(51) Int. Cl.
*C08F 4/42* (2006.01)
(52) U.S. Cl. ............... 502/115; 502/102; 502/103; 502/118; 502/126; 526/124.3
(58) Field of Classification Search ........... 502/115, 502/102, 118, 126, 103; 526/124.3
See application file for complete search history.

(56) References Cited

U.S. PATENT DOCUMENTS

| 4,218,339 | A | | 8/1980 | Zucchini et al. | ........ 252/429 B |
|---|---|---|---|---|---|
| 4,400,303 | A | | 8/1983 | Martin | ................ 252/429 B |
| 5,200,502 | A | * | 4/1993 | Kao et al. | ................ 528/494 |
| 5,278,210 | A | * | 1/1994 | Morini et al. | ............. 524/100 |
| 5,733,987 | A | | 3/1998 | Covezzi et al. | ............. 526/65 |
| 6,300,273 | B1 | * | 10/2001 | Sacchetti et al. | ........... 502/126 |
| 6,451,726 | B1 | * | 9/2002 | Zambon et al. | ............. 502/152 |
| 6,468,938 | B1 | * | 10/2002 | Govoni et al. | ............. 502/126 |
| 6,541,582 | B1 | * | 4/2003 | Morini et al. | ............ 526/124.3 |
| 6,627,710 | B1 | * | 9/2003 | Sacchetti et al. | .......... 526/112 |
| 6,818,583 | B1 | * | 11/2004 | Morini et al. | ............. 502/103 |
| 6,818,711 | B2 | * | 11/2004 | Bauch | ....................... 526/142 |
| 6,841,503 | B2 | * | 1/2005 | Fujiwara et al. | ........... 502/128 |
| 6,864,207 | B2 | * | 3/2005 | Knoeppel et al. | ........... 502/110 |
| 6,903,041 | B2 | * | 6/2005 | Kumamoto et al. | ........ 502/128 |
| 6,906,154 | B2 | * | 6/2005 | Fushimi et al. | .......... 526/124.3 |

FOREIGN PATENT DOCUMENTS

| EP | 0155682 | 9/1985 |
|---|---|---|
| EP | 0361494 | 4/1990 |
| EP | 0434082 | 6/1991 |
| EP | 0437264 | 7/1991 |
| EP | 0479588 | 4/1992 |
| EP | 0506074 | 9/1992 |
| EP | 0633270 | 1/1995 |
| WO | 9221706 | 12/1992 |
| WO | 9303078 | 2/1993 |
| WO | 9957160 | 11/1999 |
| WO | 0008065 | 2/2000 |
| WO | WO 00/58368 | * 10/2000 |
| WO | 02100904 | 12/2002 |

* cited by examiner

*Primary Examiner*—Helene Klemanski
(74) *Attorney, Agent, or Firm*—Jarrod N Raphael

(57) ABSTRACT

Catalyst components for the polymerization of olefins $CH_2=CHR$, wherein R is hydrogen or a hydrocarbon radical having 1–12 carbon atoms, comprising Mg, Ti, Cl, OR groups, where R is a C1–C10 alkyl group optionally containing heteroatoms, and an ether having two or more ether groups, characterized by the fact that the Mg/Ti weight ratio is lower than 3 from 2 to 6.5 the Cl/Ti weight ratio is from 1.5 to 6, the OR/Ti weight ratio is from 0.5 to 3.5 and at least 50% of the Titanium atoms are in a valence state lower than 4. The said catalyst components allow the preparation of ethylene copolymers with a low content of xylene soluble fractions.

16 Claims, No Drawings

CATALYST COMPONENTS FOR THE POLYMERIZATION OF OLEFINS

This application is the U.S. national stage of International Application PCT/EP03/05268, filed May 19, 2003.

The present invention relates to catalyst components for the polymerization of olefins $CH_2=CHR^{VIII}$, wherein $R^{VIII}$ is hydrogen or a hydrocarbon radical having 1–12 carbon atoms. In particular, the present invention relates to solid catalyst components comprising Mg, Ti, halogen, OR groups in a certain ratio and an ether containing two or more ether groups. This catalyst component is particularly suitable for the preparation of copolymers of ethylene with α-olefins due to its capability of randomly distribute the α-olefins along and among the polymer chain.

Accordingly, another object of the present invention is the use of said catalysts in a process for the copolymerization of olefins in order to produce ethylene/α-olefin copolymers.

Linear low-density polyethylene (LLDPE) is one of the most important products in the polyolefin field. Due to its characteristics, it finds application in many sectors and in particular in the field of wrapping and packaging of goods where, for example, the use of stretchable films based on LLDPE constitutes an application of significant commercial importance. LLDPE is commercially produced with liquid phase processes (solution or slurry) or via the more economical gas-phase process. Both processes involve the widespread use of Ziegler-Natta $MgCl_2$-supported catalysts that are generally formed by the reaction of a solid catalyst component, in which a titanium compound is supported on a magnesium halide, with an alkylaluminium compound.

As far as the preparation of LLDPE is concerned, said catalysts are required to show good comonomer distribution suitably coupled with high yields.

The good comonomer distribution in particular ensure the achievement of an ethylene copolymer which has a density sufficiently lower with respect to HDPE while, at the same time, is not affected by too high values of fractions soluble in hydrocarbon solvents, like hexane or xylene, which worsen certain properties of the said copolymers.

U.S. Pat. No. 4,218,339 discloses catalyst components for the polymerization of olefins obtained by the reacting a Mg compound, preferably a Mg halide with an oxygen containing compound of a metal M selected from Ti, V or Zr and then by contacting the so obtained product with a compound, or a mixture of compounds, in order to explicate on said reaction product an halogenating and reducing action. The said catalyst components are transformed in active catalyst for the polymerization of olefins by reaction with aluminum trialkyls in particular triisobutyl aluminum. Although generically stated that the catalysts are active also in the copolymerization of ethylene with alpha olefins their use in this type of polymerization has never been exemplified.

EP 155682 discloses the use of the same kind of catalyst components in the preparation of LLDPE polymers. From the comparison of Example 11 and comparative example 7 it is apparent that the said catalyst components are endowed with a good capability of distributing the comonomer only when a specific nitrogen containing external donor is used together with the aluminum trialkyl. No mention is made of the possibility of using such electron donors in the preparation of the solid component, i.e. as internal donor.

EP633270 discloses the use of catalysts systems in the (co)polymerization of ethylene comprising (a) a solid catalyst component based on a Mg halide, a titanium compound having at least a Ti-halogen bond, (b) an Al-alkyl compound and (c) a diether as external donor. The solid catalyst components specifically disclosed and used have a Mg/Ti weight ratio of 5.

According to the disclosure, the use of such diethers as external donors improves the comonomer distribution of those catalyst systems in connection with LLDPE preparation. The possibility of using such diethers as internal donors is never mentioned and also the possibility of using catalyst components characterized by specific weight ratios is not mentioned.

The applicant has now found that certain specific catalyst components containing diethers as internal donors are particularly suitable for the preparation of LLDPE polymers with improved comonomer randomization. These solid catalyst components comprise Mg, Ti, Cl, OR groups, where R is a C1–C10 alkyl group optionally containing heteroatoms, and an ether having two or more ether groups, and are characterized by the fact that the Mg/Ti weight ratio is lower than 3, the Cl/Ti weight ratio is from 1.5 to 6, the OR/Ti weight ratio is from 0.5 to 3.5 and at least 50% of the titanium atoms is in a valence state lower than 4. Preferably, the Cl/Ti weight ratio is from 2 to 5.5 and more preferably from 2.5 to 5, while the OR/Ti weight ratio is preferably from 0.7 to 3 and more preferably from 0.7 to 2.5. It is moreover preferred that at least 60% and more preferably 70% of the titanium atoms is in a valence state lower than 4. Preferably Mg/Ti weight ratio is lower than 2 and more preferably lower than 1.5.

Preferably the ether having at least two ether groups is selected among 1,3 diethers of the formula (I):

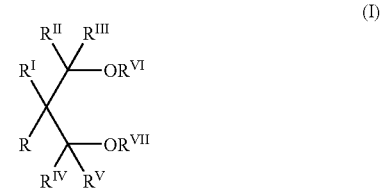

wherein R, $R^I$, $R^{II}$, $R^{III}$, $R^{IV}$ and $R^V$ equal to or different from each other, are hydrogen or hydrocarbon radicals having from 1 to 18 carbon atoms, and $R^{VI}$ and $R^{VII}$, equal to or different from each other, have the same meaning of R–$R^V$ except that they cannot be hydrogen; one or more of the R–$R^{VII}$ groups can be linked to form a cycle. The 1,3-diethers in which $R^{VI}$ and $R^{VII}$ are selected from $C_1$–$C_4$ alkyl radicals are particularly preferred. In particular, the 1,3-diethers of formula (I), in which the radicals $R^{II}$–$R^V$ are hydrogen, the radicals $R^{VI}$ and $R^{VII}$ are $C_1$–$C_4$ alkyl radicals and the radicals R and $R^I$, same or different from each other, are C1–C18 alkyl groups, $C_3$–$C_{18}$ cycloalkyl groups, C6–C18 aryl groups, or C7–C18 alkylaryl or arylalkyl groups. Most preferred are the diethers in which R and $R^I$ are C1–C10 linear or branched alkyls.

When $R^O$ is methyl, ethyl, propyl, or isopropyl, $R^I$ can be ethyl, propyl, isopropyl, butyl, n-octyl, isobutyl, tert-butyl, 2-ethylhexyl, cyclopentyl, cyclohexyl, methylcyclohexyl, phenyl or benzyl; when $R^O$ is hydrogen, $R^I$ can be ethyl, butyl, sec.butyl, tert-butyl, 2-ethylhexyl, cyclohexylethyl, diphenylmethyl, p-chlorophenyl, 1-naphthyl, 1-decahydronaphthyl; $R^O$ and $R^I$ can also be the same and can be ethyl, propyl, isopropyl, butyl, isobutyl, tert-butyl, neopentyl, phenyl, benzyl, cyclohexyl, cyclopentyl.

Preferred diethers are 2-isopropyl-2-isoamil-1,3-dimethoxypropane, 1,2-dimethoxyethane, 2-methyl-2-octyl-1,3-dimethoxypropane and 1,3-dimethoxypropane.

The solid catalyst component of the invention can be prepared according to the general disclosure of U.S. Pat. No. 4,218,339. In particular it can be obtained by carrying out a reaction between (A) a magnesium compound of formula $$X_nMg(OR^{VIIII})_{2-n}$$

Wherein X is a halogen atom, hydroxyl group or an alkyl, aryl or cycloalkyl radical containing 1–20 carbon atoms; $R^{VIIII}$ is an alkyl, aryl or cycloalkyl radicals containing 1–20 carbon atoms, or a —COR' radical in which R' has the same meaning as R; $0 \leq n \leq 2$; (B) a di- or polyether ether, (C) a compound of Ti, containing at least two metaloxygen bonds Ti—$OR^X$, wherein $R^X$ is an alkyl, aryl or cycloalkyl radical having 1–20 carbon atoms, and (D) a compound capable of exerting a halogenating and a reducing action on compound (C), i.e. capable of substituting in compound (C) a least one group —$OR^X$ with a halogen atom and of reducing the metal of compound (C) to a lower valence, or a mixture of a halogenating compound with a reducing substance.

Examples of (A) compounds are the Mg dihalides, the Mg mono-and dialcoholates, examples of which are $Mg(OC_2H_5)_2$, $Mg(O-n-C_4H_9)_2$, $C_2H_5O$ MgCl, n-$C_4H_9O$ MgCl, the Mg carboxylates such as Mg acetates. As Mg dihalides the following compounds can be employed $MgCl_2$, which is the preferred one, $MgBr_2$, $MgI_2$, $MgCl_2.nR^{XI}OH$ ($R^{XI}$=alkyl group, n=1–6), for example $MgCl_2.3C_2H_5OH$, or $MgCl_2.nH_2O$ ($0 \leq n \leq 6$), and adducts of $MgCl_2$ with electron donor compounds not containing active hydrogen atoms, like the esters of carboxylic acids, the ethers, ketones or amines. Examples of suitable di or polyether (B) have already been mentioned.

Specific examples of component (C) are: $Ti(OC_2H_5)_4$, $Ti(O-n-C_4H_9)_4$, $Ti(O-i-C_3H_7)_4$, $Ti(OC_6H_5)_4$, Ti-triacetylacetonate, $Ti(OCH_3)_2(OC_2H_5)_2$. However, haloalcoholates can be also used, as for instance (n-$C_4H_9)_3TiCl$.

Components (D) comprises a halogen-containing, preferably a chlorine-containing compounds, capable of substituting a halogen atom for at least one group-$OR^X$ in component (C). Specific examples of such compounds include organic acid halides $R^XCOX$ (in which X is halogen, preferably chlorine, and $R^X$ is an aliphatic or aromatic radical); hydrogen halides such as HCl, $SOCl_2$, $COCl_2$, $TiCl_4$, $BCl_3$, and others.

Particularly satisfactory results are achieved by using halogen-containing silicon compounds or halogen and hydrogen-containing silicon compounds. The latter act as both reducing agents and halogenating agents. Specific examples of such silicon compounds include:

silicon halides having formula $SiX_{4-n}Y_n$, in which X and Y represent halogen atoms, e.g., Cl and Br, and n is a number varying from zero to 3, inclusive as $SiCl_4$;
chlorosiloxanes of formula $Si_nO_{n-1}Cl_{2n+2}$, in which n is a number varying form 2 to 7 inclusive, e.g., $Si_2OCl_6$;
Halogenated polysilanes having formula $Si_nX_{2n+2}$, wherein X is halogen and n is a number varying form 2 to 6, inclusive, for instance $Si_4Cl_{10}$;
Halogensilanes having formula $SiH_{4-n}X_n$ in which X is halogen and n is a number varying form 1 to 3, inclusive, e.g., $SiHCl_3$;
Alkyl-halogensilanes having formula $R^{XII}_nSiH_xX_y$, wherein $R^{XII}$ is an aliphatic or aromatic radical, X is halogen, n is a number from 1 to 3, inclusive, x is a number varying form zero to 2, inclusive, and y is a number varying form 1 to 3, inclusive, e.g., $C_2H_5SiCl_3$; $CH_3SiCl_2H$; $(CH_3)_2SiCl_2$;
Alkoxy-halogensilanes of formula $Si(OR^{XIII})_{4-n}X_n$ in which X is halogen, $R^{XIII}$ is alkyl or aryl having 1 to 20 carbon atoms and n is a number from 1 to 3, inclusive, e.g., $Si(OC_2H_5)Cl_3$.

If the product of the reaction between components (A), (B) and (C) is reacted with a compound which is halogenating agent, and not a halogenating and reducing agent, such halogenating compound should then be used with a compound which is a reducing agent for the (A) and (C) reaction product, i.e., capable of lowering the valence of the metal contained in component (C) to a value below that of its starting valence. Example of such useful reducing agents include Na-alkyls, Li-alkyls, Zn-alkyls, Mg-alkyls and corresponding aryl-derivatives, Grignard compounds of the type RMgX where R is an aliphatic or aromatic hydrocarbon radical and X is halogen, the Na+alcohol system, and furthermore NaH and LiH. Particularly effective as reducing agents are the polyhydrodisiloxanes in which the monomer unit has the general formula

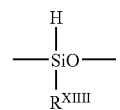

Wherein $R^{XIIII}$ is H, halogen, alkyl with 1 to 10 carbon atoms, aryl, alkoxyl, aryloxyl or carboxyl, and the polymerization grade ranges from 2 to 1,000, preferably from 3 to 100. Specific examples of such polyhydrosyloxanes include the compounds: $(CH_3)_3Si$—O—$[(CH_3)HSiO]_n$—$Si(CH_3)_3$, $(CH_3HSiO)_4$, $(CH_3HSiO)_3$, $H_3Si$—O—$SiH_2$—$OSiH_3$, phenylhydropolysiloxanes in which the hydrogen atoms can be partially replaced by methyl group.

Other silicon compounds useful as reducing agent in the practice of this invention are:

Silanes $Si_nH_{2n+2}$, in which n is a number equal to or higher that 1, preferably equal to or higher than 3, e.g., $Si_3H_8$;
Polysilanes that contain the group $(SiH)_x$ in which $x \geq 2$;
Alkyl or aryl silanes $R^{XV}_xSiH_{4-x}$, in which $R^{XV}$ is alkyl or aryl and x is a number varying from 1 to 3, inclusive, e.g., $(C_6H_5)_3SiH$;
Alkoxy or aryloxy silanes $(R^{XVI}O)_xSiH_{4-x}$, in which $R^{XVI}$ is alkyl or aryl and x is a number varying for 1 to 3, inclusive, e.g., $(C_2H_5O)_3SiH$.

The catalyst components of the invention can be obtained by reacting (A) and (B), (C) and (D) in an aliphatic or aromatic hydrocarbon diluent or in the absence of diluent. When at least one of the reagents is in the liquid state at the reaction temperature and pressure, the use of a solvent can be omitted.

(A), (B) and (C) can be reacted preferably until a homogeneous product is obtained which is then reacted with component (D).

However, if (D) consists of a halogenating compound plus a reducing compound, the order of additional makes no difference: i.e., either the halogenating compound or the reducing compound can be reacted first. It is also possible to add both compounds simultaneously.

The reactions are conducted at a temperature ranging from −10° C. to 250° C., preferably from 20° C. to 200° C., the selection of the temperature depending also on the type of component (D), because the higher its reducing power, the lower the preferred reaction temperatures.

Since (D) is both a halogenating agent and a reducing agent, or it consists of a halogenating compound plus a reducing compound, the titanium in the final catalyst-forming component is almost entirely in the trivalent state, provided that a sufficient quantity of reducing agent is used.

The solid catalyst components according to the present invention are converted into catalysts for the polymerization of olefins by reacting them with organoaluminum compounds according to known methods.

In particular, it is an object of the present invention a catalyst for the polymerization of olefins $CH_2=CHR^{VIII}$, in which $R^{VIII}$ is hydrogen or a hydrocarbyl radical with 1–12 carbon atoms, comprising the product of the reaction between a solid catalyst component as described above and an alkylaluminum compound.

The alkyl-Al compound is preferably selected from the trialkyl aluminum compounds such as for example trimethylaluminum (TMA), triethylaluminum (TEA), triisobutylaluminum (TIBA), tri-n-butylaluminum, tri-n-hexylaluminum, tri-n-octylaluminum. It is also possible to use, and in certain cases preferred, mixtures of trialkylaluminum's with alkylaluminum halides.

The alkylaluminum halide is suitably selected among alkylaluminum chlorides and in particular among diethylaluminum chloride (DEAC), diisobutylaluminum chloride, Al-sesquichloride and dimethylaluminum chloride (DMAC). Dimethylaluminum chloride is especially preferred.

The component of the invention can be used to prepare the catalyst system directly as obtained from its preparation process. Alternatively, it can be pre-polymerized before being used in the main polymerization process. This is particularly preferred when the main polymerization process is carried out in the gas phase. The prepolymerization can be carried out with any of the olefins $CH_2=CHR^{XVII}$, where $R^{XVII}$ is H or a C1–C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 100 g per gram of solid catalyst component. The pre-polymerization step can be carried out at temperatures from 0 to 80° C., preferably from 5 to 50° C., in the liquid or gas phase. The co-catalyst can be the same as, or different from, the cocatalyst (II). Therefore it can be used an aluminumalkyl halide or the corresponding not halogenated ones such as aluminum triethyl, aluminum triisobutyl, aluminum tri-n-octyl etc. In accordance with the present invention, a halogenated aluminumalkyl compound can also be used in the prepolymerization step. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The prepolymerized catalyst component can also be subject to a further treatment with a titanium compound before being used in the main polymerization step. In this case the use of $TiCl_4$ is particularly preferred. The reaction with the Ti compound can be carried out by suspending the prepolymerized catalyst component in the liquid Ti compound optionally in mixture with a liquid diluent; the mixture is heated to 60–120° C. and kept at this temperature for 0.5–2 hours.

Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed.

The catalysts of the present invention are particularly suitable for preparing linear low density polyethylenes (LLDPE, having a density lower than 0.940 g/cm$^3$) and very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%. In addition they are also particularly suitable for the preparation of high density ethylene polymers (HDPE, having a density higher than 0.940 g/cm$^3$), comprising ethylene homopolymers and copolymers of ethylene with alpha-olefins having 3–12 carbon atoms, especially characterized by a narrow molecular weight distribution expressed by a ratio between the Melt Index measured at 190° C. according to ASTM D-1238 condition "F" and "E" (F/E ratio) lower than 28 in particular lower than 27. However, they can also be used to prepare a broad range of other polyolefin products including, for example, elastomeric copolymers of ethylene and propylene and elastomeric terpolymers of ethylene and propylene with smaller proportions of a diene having a content by weight of units derived from ethylene of between about 30 and 70%; isotactic polypropylenes and crystalline copolymers of propylene and ethylene and/or other alpha-olefins having a content of units derived from propylene of higher than 85% by weight; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight.

The following examples are given in order to further describe the present invention in a non-limiting manner.

Characterization

The properties are determined according to the following methods:

Melt Index: measured at 190° C. according to ASTM D-1238 condition "E" (load of 2.16 Kg) and "F" (load of 21.6 Kg);

Fraction soluble in xylene. (XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene was determined via Infrared Spectrometry.

The α-olefins higher than 1-butene were determined via Infra-Red analysis.

Effective density: according to ASTM-D 1505 using a gradient column. The measurement was carried out on a portion of the polymer extruded for the Melt Index determination.

Thermal analysis: Calorimetric measurements were performed by using a differential scanning calorimeter DSC Perkin-Elmer. The instrument is calibrated with indium and tin standards. The weighted sample (5–10 mg), obtained from the Melt Index determination, was sealed into aluminum pans, thermostatted at 5° C. for 3 minutes, heated to 200° C. at 20° C./min and kept at that temperature for a time long enough (5 minutes) to allow a complete melting of all the crystallites. Successively, after cooling at 20° C./min to −20° C., the peak temperature was assumed as crystallization temperature (Tc). After standing 5 minutes at 0° C., the sample was heated to 200° C. at a rate of 20° C./min. In this second heating run, the peak temperature was assumed as melting temperature (Tm) and the area as the global melting hentalpy ($\Delta H$).

Determination of $Ti^{(red)}$ 0.5 g of the sample in powder form, are dissolved in 100 ml of HCl 2.7M in the presence of solid $CO_2$. The so obtained solution is then subject to a volumetric titration with a solution of $FeNH_4(SO_4)_2.12H_2O$ 0.1N, in the presence of solid $CO_2$, using as indicator of the equivalence point $NH_4SCN$ (25% water solution). The stoichiometric calculations based on the volume of the titration agent consumed give the weight amount of $Ti^{3+}$ in the sample.

Determination of $Ti_{(Tot)}$.

1 g of the sample in powder form is poured in a 500 ml-glass flask, containing 100 ml of $H_2SO_4$ 1.8M. The system is left to stay for about 1 hour, while stirring to increase the dissolution of the sample. After that, the whole is poured in a known volume flask and brought to exact volume with water. 100 ml of the solution obtained above are poured in a glass flask containing 50 g of metallic Zn and 50 ml of HCl in order to convert all the Ti atoms at an oxidation state lower than 4. After about 1 hour the solution was filtered in a glass flask containing solid $CO_2$. It was obtained a clear solution which was titrated according to the same procedure as that illustrated for the determination of the $Ti^{(red)}$.

Determination of Mg: has been carried out via inductively coupled plasma emission spectroscopy (ICP).

Determination of Cl: has been carried out via potentiometric tritration.

Determination of OR groups: via Gas-Chromatography analysis

EXAMPLES

Ethylene/1-butene polymerization: General Procedure

A 4.5 liter stainless-steel autoclave equipped with a magnetic stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (amount as reported in table 2), ethylene (7.0 bar, partial pressure) and hydrogen (2.0 bar, partial pressure).

In a 100 cm³ three neck glass flask were introduced in the following order, 50 cm³ of anhydrous hexane, 9.6 cm³ of 10% by wt/vol, TEA/hexane solution (or the equivalent amount of the cocatalyst reported in Table 2), and the solid catalyst of example (amount reported in table 2). They were mixed together and stirred at room temperature for 20 minutes and then introduced in the reactor through the steel vial by using a nitrogen overpressure.

Under continuous stirring, the total pressure was maintained constant at 75° C. for 120 minutes by feeding ethylene. At the end the reactor was depressurized and the temperature was dropped to 30° C. The recovered polymer was dried at 70° C. under a nitrogen flow and weighted.

Ethylene Homopolymerization: General Procedure.

A 4.0 liter stainless-steel autoclave equipped with a magnetic stirrer, temperature and pressure indicator, feeding line for ethylene, hexane, and hydrogen, was used and purified by fluxing pure nitrogen at 70° C. for 60 minutes. Then, 1550 cm³ of hexane containing 7 cm³ of 10% by wt/vol TEAL/hexane solution, were introduced at a temperature of 30° C. under nitrogen flow. In a separate 200 ml round bottom glass bottle were successively introduced, 50 cm³ of anhydrous hexane, 1 cm³ of 10% by wt/vol, TEAL/hexane solution and the amount of the solid catalyst reported in table 3. They were mixed together, aged 10 minutes at room temperature and introduced under nitrogen flow into the reactor. The autoclave was closed then the temperature was raised to 75° C. and hydrogen (4.0 bar, partial pressure) and ethylene (7.0 bar, partial pressure) were added.

Under continuous stirring, the total pressure was maintained at 75° C. for 120 minutes by feeding ethylene. At the end the reactor was depressurised and the temperature was dropped to 30° C. The recovered polymer was dried at 70° C. under a nitrogen flow.

The amount of recovered polyethylene and the polymer characteristics are reported in table 3.

Example 1

Preparation of the Solid Component A 250 ml three neck round bottom flask, equipped with a magnetic stirring system, was dried in an oven at 70° C., cooled in a nitrogen flow and maintained under a $N_2$ atmosphere. 62 ml (0.1823 mole) of pure tetrabutylorto Titanate were introduced and heated to 40° C. 8.0 g (0.0839 mole) of anhydrous Magnesium chloride and 4.3 ml (16.82 mmole) of 2-iso-propyl-2-iso-amil-1,3-dimethoxypropane (2iP2iA-DMP) were added under stirring. The final suspension was heated to 140° C. and continuously stirred for 4 hours to obtain a complete solubilization.

The solution was then cooled to 90° C. and added of 120 ml of dried heptane. The obtained mixture was then siphoned in a 500 ml glass reactor equipped with mechanical stirrer, condenser, maintained under nitrogen atmosphere and thermostatted at 48° C. With the stirring set at 300 r.p.m., 32 ml of poly(MethylHydro)siloxane (PMHS) were added in 120 minutes. Then, 35 ml (0.3053 mole) of pure tetrachlorosilane, were dropped in 2 h. The final suspension was heated at 60° C. in 20 minutes and maintained in this condition for further 2 hours. After settling at 50° C., the liquid phase was removed. The solid was then washed once with heptane at 50° C. and six times, at 25° C., with hexane and finally dried under vacuum at 40° C. to obtain a free flowing powder.

The catalyst characteristics are reported in table 1.

The polymerization was carried out according to the general procedure given above. The specific conditions used and the characteristics of the polymer are reported in table 2.

Examples 2–3

The catalyst component was prepared according to the procedure reported in Example 1 with the difference that 2-methyl-2-octyl-1,3-dimethoxypropane (16.8 mmoles) was used instead of 2-iso-propyl-2-iso-amil-1,3-dimethoxypropane.

The polymerizations were carried out according to the general procedure given above. The specific conditions used and the characteristics of the polymer are reported in table 2.

Examples 4–7

Preparation of the Solid Component

A 250 ml three neck round bottom flask, equipped with a magnetic stirring system, was dried in an oven at 70° C., cooled in a nitrogen flow and maintained under a $N_2$ atmosphere. 62 ml (0.1823 mole) of pure tetrabutylortotitanate were introduced and heated to 40° C. 8.0 g (0.0839 mole) of anhydrous magnesium chloride were added under stirring. The final suspension was heated to 140° C. and continuously stirred for 4 hours to obtain a complete solubilization.

The solution was then cooled to 90° C. and added of 120 ml of dried heptane and 1.7 ml (0.0168 mole) of 1,2-dimethoxyethane (1,2-DME). The obtained mixture was then siphoned in 500 ml glass reactor equipped with mechanical stirrer, condenser, maintained under nitrogen atmosphere and thermostatted at 48° C. With the stirring set at 300 rpm., 32 ml of poly(methylhydro)siloxane (PMHS) were added in 120 minutes. Then, 35 ml (0.3053 mole) of pure tetrachlorosilane, were dropped in 2 h. The final suspension was heated at 60° C. in 20 minutes and maintained in this condition for further 2 hours. After settling at 50° C., the liquid phase was removed. The solid was then washed once with heptane at 50° C. and six times, at 25° C., with hexane and finally dried under vacuum at 40° C. to obtain a free flowing powder. The characteristics of the polymer are reported in table 1.

The polymerizations were carried out according to the general procedure given above. The specific conditions used and the characteristics of the polymer are reported in table 2.

Example 8

The catalyst component was prepared according to the procedure reported in Examples 4–7 with the difference that 2-iso-propyl-2-iso-amil-1,3-dimethoxypropane was used instead of 1,2-dimethoxyethane.

The polymerization was carried out according to the general procedure given above. The specific conditions used and the characteristics of the polymer are reported in table 2.

Example 9

The catalyst component was prepared according to the procedure reported in Examples 4–7 with the difference that 2-methyl-2-octyl-1,3-dimethoxypropane was used instead of 1,2-dimethoxyethane.

The polymerization was carried out according to the general procedure given above. The specific conditions used and the characteristics of the polymer are reported in table 2.

Example 10

The catalyst component was prepared according to the procedure reported in Examples 4–7 with the difference that 1,3-dimethoxypropane was used instead of 1,2-dimethoxyethane.

The polymerization was carried out according to the general procedure given above. The specific conditions used and the characteristics of the polymer are reported in table 2.

Comparison Example 1

The catalyst component was prepared according to the procedure reported in Examples 4–7 with the difference that no ether was used.

The polymerization was carried out according to the general procedure given above. The specific conditions used and the characteristics of the polymer are reported in table 2.

Comparison Example 2

The catalyst component was prepared according to the procedure reported in Examples 4–7 with the difference that tetrahydrofurane was used instead of 1,2-dimethoxyethane.

The polymerization was carried out according to the general procedure given above. The specific conditions used and the characteristics of the polymer are reported in table 2.

Comparison Example 3

The catalyst component was prepared according to the procedure reported in Examples 4–7 with the difference that di-n-butyl ether was used instead of 1,2-dimethoxyethane.

The polymerization was carried out according to the general procedure given above. The specific conditions used and the characteristics of the polymer are reported in table 2.

Examples 11–15 and comparison examples 4–5

Some of the catalyst prepared in the examples above have also been tested in the ethylene polymerization according to the general procedure reported above. The specific conditions and the results obtained are shown in table 3.

TABLE 1

| Example No. | Ether in preparation Type | Catalyst Composition | | | | | | |
|---|---|---|---|---|---|---|---|---|
| | | $Ti^t$ wt. % | $Ti^{3+}$ wt. % | Mg wt. % | Cl wt. % | OBu wt. % | Ether wt. % | Solv. wt. % |
| 1 | 2iP2iA-DMP | 9.0 | 8.3 | 11.5 | 43.7 | 23.9 | 6.6 | 0.5 |
| 4–7 | 1,2-DME | 13.9 | 9.2 | 8.9 | 44.2 | 14.2 | 21.8 | 0.1 |
| 8 | 2iP2iA-DMP | 13.8 | 10.3 | 7.6 | 40.7 | 16.2 | 9.9 | 0.6 |
| 2–3 | 2M2O-DMP | 13.8 | 9.1 | 7.6 | 37.1 | 19.8 | 12.5 | 0.2 |
| 9 | 2M2O-DMP | 13.7 | 8.5 | 7.0 | 39.9 | 18.9 | 8.2 | 0.2 |
| 10 | 1,3-DMP | 12.5 | 7.8 | 9.7 | 44.7 | 21.1 | 10.1 | 0.4 |
| Comp. 1 | — | 13.5 | 8.9 | 8.4 | 43.1 | 27.9 | — | 0.7 |

TABLE 1-continued

| Ex-ample No. | Ether in preparation Type | Catalyst Composition | | | | | |
|---|---|---|---|---|---|---|---|
| | | $Ti^t$ wt. % | $Ti^{3+}$ wt. % | Mg wt. % | Cl wt. % | OBu wt. % | Ether wt. % | Solv. wt. % |
| Comp. 2 | THF | 13.7 | 10.3 | 8.5 | 43.6 | 22.8 | 4.3 | 0.8 |
| Comp. 3 | $nBu_2O$ | 15.3 | 11.9 | 6.7 | | 25.6 | 4.5 | 1.6 |

2iP2iA-DMP = 2-iso-Propyl-2-iso-Amil-1,3-diMethoxyPropane
1,2-DME = 1,2-diMethoxyEthane.
2M2O-DMP = 2-Methyl-2-Octyl-1,3-diMethoxyPropane
1,3-DMP = 1,3-diMethoxyPropane
THF = tetrahydrofurane
$nBu_2O$ = di-n-Butyl ether

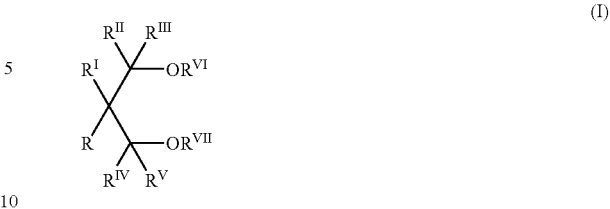

(I)

wherein $R^O$, $R^I$, $R^{II}$, $R^{III}$, $R^{VI}$ and $R^V$, equal to or different from each other, are hydrogen or hydrocarbon radicals having from 1 to 18 carbon atoms, and $R^{VI}$ and $R^{VII}$, equal to or different from each other, are hydrocarbon radicals having from 1 to 18 carbon atoms; one or more of $R^O$–$R^{VII}$ can be linked to form a cycle.

TABLE 2

| Ex | Catalyst mg | Al-alkyl type | Mmol | $1-C_4^-$ g | H2 bar | time min | Activity Kg/gcat | MIE dg/min | F dg/min | F/E | $1-C_4^-$ (I.R.) wt. % | density g/ml | D.S.C. Tc °C. | Tm °C. | ΔH J/g | X.S. wt. % |
|---|---|---|---|---|---|---|---|---|---|---|---|---|---|---|---|---|
| 1 | 25.5 | TEA | 8.4 | 150 | 2.0 | 50 | 11.4 | 0.78 | 20.6 | 26.4 | 5.1 | 0.9215 | 109 | 124 | 144 | 4.4 |
| 2 | 25 | TEA | 8.4 | 200 | 2.0 | 120 | 9.6 | 1.0 | 29.9 | 29.9 | 6.4 | 0.9186 | 101 | 124 | 136 | 8.3 |
| 3 | 19.5 | TEA/DMAC | 4.2/4.2 | 150 | 2.0 | 120 | 11.8 | 0.73 | 19.6 | 26.8 | 6.0 | 0.9251 | 103 | 123 | 168 | 5.6 |
| 4 | 15 | TEA/DMAC | 4.2/4.2 | 130 | 2.0 | 120 | 15.3 | 0.28 | 6.7 | 23.9 | 5.9 | 0.9238 | 99 | 122 | 121 | 3.6 |
| 5 | 19.5 | TEA/DMAC | 4.2/4.2 | 150 | 2.0 | 120 | 13.2 | 0.52 | 13.0 | 25.1 | 9.4 | 0.9170 | 96 | 120 | 111 | 8.6 |
| 6 | 15.4 | TEA/DMAC | 4.2/4.2 | 170 | 2.0 | 120 | 12.3 | 0.72 | 15.4 | 21.3 | 8.1 | 0.9195 | 97 | 120 | 126 | 7.7 |
| 7 | 14.7 | TMA | 8.4 | 170 | 2.0 | 120 | 11.2 | 0.74 | 19.2 | 25.9 | 7.7 | 0.9205 | 100 | 122 | 133 | 8.8 |
| 8 | 24.6 | TEA | 8.4 | 200 | 2.0 | 120 | 11.0 | 0.97 | 26.1 | 27.0 | 6.4 | 0.9204 | 102 | 126 | 141 | 7.3 |
| 9 | 19.3 | TEA/DMAC | 4.2/4.2 | 200 | 2.0 | 120 | 15.0 | 0.89 | 22.3 | 25.0 | 8.0 | 0.9196 | 97 | 122 | 115 | 7.8 |
| 10 | 26.2 | TEA | 8.4 | 150 | 2.0 | 120 | 9.2 | 1.35 | 34.6 | 25.6 | 5.0 | 0.9212 | 104 | 126 | 145 | 4.9 |
| Comp 1 | 24 | TEA | 8.4 | 150 | 2.0 | 120 | 14.2 | 3.71 | 105 | 28.3 | 10.6 | 0.9174 | 104 | 124 | 129 | 15.5 |
| Comp 2 | 14.5 | TEA | 8.4 | 200 | 1.5 | 35 | 16.1 | 3.34 | 106 | 31.8 | 9.4 | 0.9155 | 102 | 120 | 143 | 18.5 |
| Camp 3 | 14.5 | TEA | 8.4 | 200 | 2.0 | 120 | 16.2 | 2.34 | 67.1 | 28.7 | 7.2 | 0.9237 | 100 | 122 | 145 | 9.1 |

TABLE 3

| Example | Catalyst (Prepared as) | mg | Cocatalyst | mmol | PE g | Kg/g cat | MELT INDEX E g/10' | F g/10' | F/E |
|---|---|---|---|---|---|---|---|---|---|
| 11 | Ex. 1 | 17 | TEAL | 7.0 | 125 | 7.4 | 0.57 | 13.2 | 23.2 |
| 12 | Ex. 4–7 | 19.3 | TEAL | 7.0 | 89 | 4.6 | 0.29 | 7.6 | 26.2 |
| 13 | Ex. 8 | 16 | TEAL | 7.0 | 80 | 5.0 | 0.59 | 15.2 | 25.8 |
| 14 | Ex. 9 | 19.4 | TEAL | 7.0 | 95 | 4.9 | 0.37 | 9.5 | 25.7 |
| 15 | Ex. 10 | 20.5 | TEAL | 7.0 | 210 | 10.2 | 0.73 | 19.1 | 26.2 |
| Comp 4 | Comp. 2 | 16.5 | TEAL | 7.0 | 205 | 12.4 | 1.00 | 29.0 | 29.0 |
| Comp 5 | Comp. 3 | 19.8 | TEAL | 7.0 | 206 | 10.4 | 1.00 | 29.3 | 29.3 |

The invention claimed is:

1. Catalyst components for polymerizing olefins comprising Mg, Ti, Cl, and OR groups, where R is a $C_1$–$C_{10}$ alkyl group optionally containing heteroatoms, or an ether having two or more ether groups, wherein a Mg/Ti weight ratio is lower than 3, a Cl/Ti weight ratio is from 1.5 to 6, an OR/Ti weight ratio is from 0.5 to 3.5 and at least 50% of the titanium is in a valence state lower than 4.

2. The catalyst components according to claim 1 in which the ether having at least two ether groups is selected from 1,3 diethers of formula (I):

3. The catalyst components according to claim 2 in which $R^{VI}$ and $R^{VII}$ are selected from $C_1$–$C_4$ alkyl radicals.

4. The catalyst components according to claim 2 in which the radicals $R^{II}$–$R^V$ are hydrogen, the radicals $R^{VI}$ and $R^{VII}$ are $C_1$–$C_4$ alkyl radicals, and the radicals $R^O$ and $R^I$, equal to or different from each other, are $C_1$–$C_{18}$ alkyl groups, $C_3$–$C_{18}$ cycloalkyl groups, $C_6$–$C_{18}$ aryl groups, or $C_7$–$C_{18}$ alkylaryl or arylalkyl groups.

5. The catalyst components according to claim 4 in which $R^O$ and $R^I$ are $C_1$–$C_{10}$ linear or branched alkyls.

6. The catalyst components according to claim 1 in which the ether having at least two ether groups is a 1,2 diether.

7. The catalyst component according to claim 1 in which the Mg/Ti weight ratio is lower than 2, the Cl/Ti weight ratio is from 2 to 5.5, and the OR/Ti weight ratio is from 0.7 to 3.

8. The catalyst components according to claim 1 in which at least 60% of the titanium is in a valence state lower than 4.

9. The catalyst components according to claim 7 in which the Mg/Ti weight ratio is lower than 1.5, the Cl/Ti weight ratio is from 2.5 to 5, and the OR/Ti weight ratio is from 0.7 to 2.5.

10. The catalyst components according to claim 8 in which at least 70% of the titanium is in a valence state lower than 4.

11. A catalyst for polymerizing olefins obtained by contacting (i) a catalyst component comprising Mg, Ti, Cl, and OR groups, where R is a $C_1$–$C_{10}$ alkyl group optionally containing heteroatoms, or an ether having two or more ether groups, wherein a Mg/Ti weight ratio is lower than 3, a Cl/Ti weight ratio is from 1.5 to 6, an OR/Ti weight ratio is from 0.5 to 3.5 and at least 50% of the titanium is in a valence state lower than 4, with (ii) an organoaluminum compound.

12. The catalyst according to claim 11 in which the organoaluminum compound is selected from trialkyl aluminum compounds.

13. The catalyst according to claim 11 in which the organoaluminum compound is selected from mixtures of trialkylaluminum and alkylaluminum halides.

14. The catalyst according to claim 13 in which the alkylaluminum halide is selected from diethylaluminum chloride, diisobutylaluminum chloride, Al-sesquichloride, and dimethylaluminum chloride.

15. A process for (co)polymerizing olefins of formula (II)

$$CH_2=CHR^{VIII} \qquad (II)$$

where $R^{VIII}$ is H or a $C_1$–$C_{12}$ hydrocarbon group, carried out in presence of a catalyst for polymerizing olefins obtained by contacting (i) a catalyst component comprising Mg, Ti, Cl, and OR groups, where R is a $C_1$–$C_{10}$ alkyl group optionally containing heteroatoms, or an ether having two or more ether groups, wherein a Mg/Ti weight ratio is lower than 3, a Cl/Ti weight ratio is from 1.5 to 6, an OR/Ti weight ratio is from 0.5 to 3.5 and at least 50% of the titanium is in a valence state lower than 4; with (ii) an organoaluminum compound.

16. The process according to claim 15 in which the olefins are ethylene and one or more alpha-olefins having from 3 to 12 carbon atoms.

* * * * *

UNITED STATES PATENT AND TRADEMARK OFFICE
CERTIFICATE OF CORRECTION

PATENT NO. : 7,208,436 B2  Page 1 of 1
APPLICATION NO. : 10/517587
DATED : April 24, 2007
INVENTOR(S) : Tiziano Dall'Occo et al.

It is certified that error appears in the above-identified patent and that said Letters Patent is hereby corrected as shown below:

At col. 12, lines 1-12 claim 2, delete Formula (I) and insert instead:

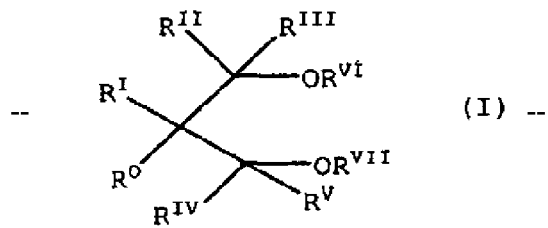

Signed and Sealed this

First Day of September, 2009

David J. Kappos
*Director of the United States Patent and Trademark Office*